July 29, 1924.
R. E. BASSLER
1,502,653
AIRCRAFT ARRESTING DEVICE
Filed Jan. 30 1923  4 Sheets-Sheet 1
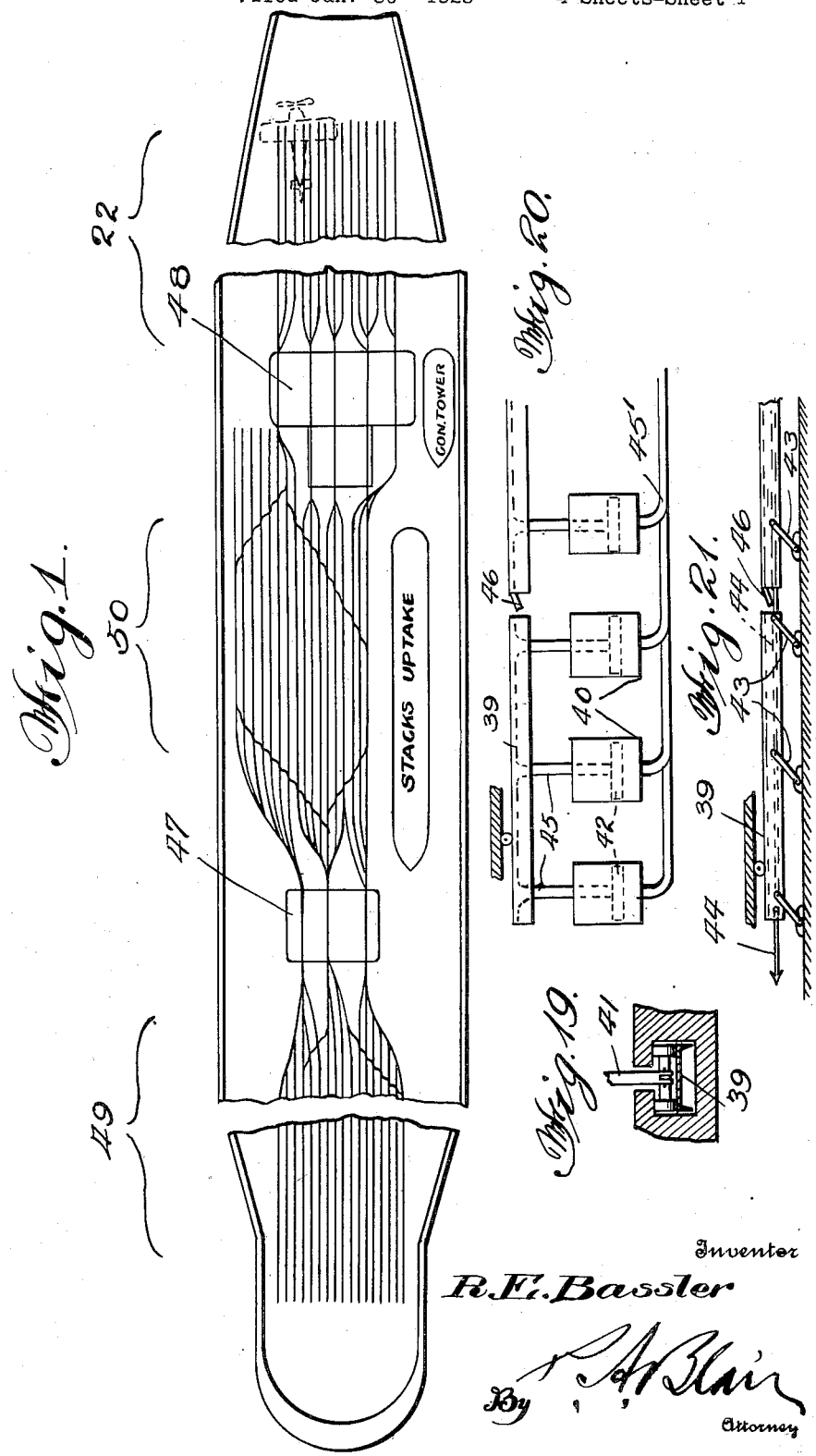

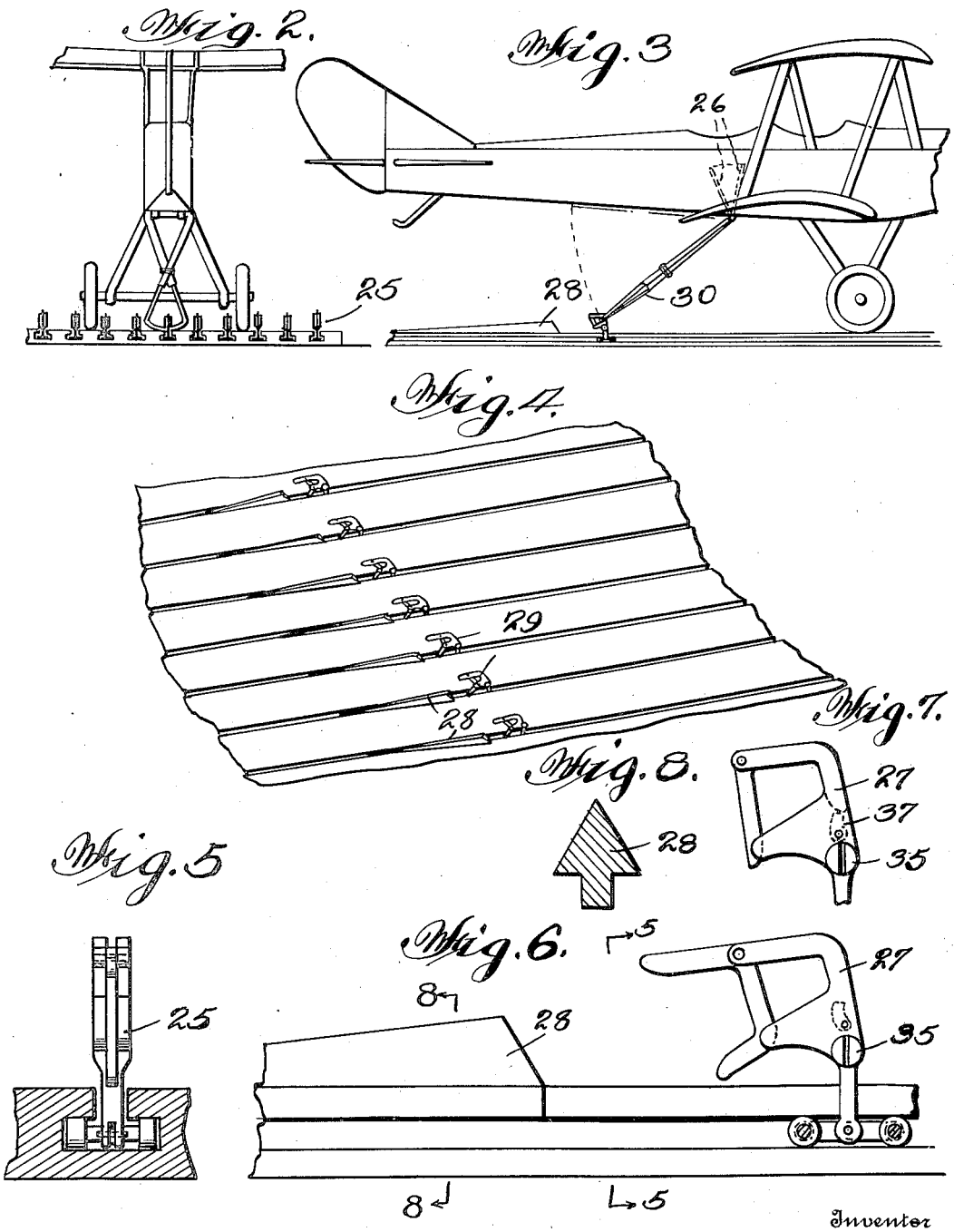

July 29, 1924. 1,502,653
R. E. BASSLER
AIRCRAFT ARRESTING DEVICE
Filed Jan. 30, 1923  4 Sheets-Sheet 3
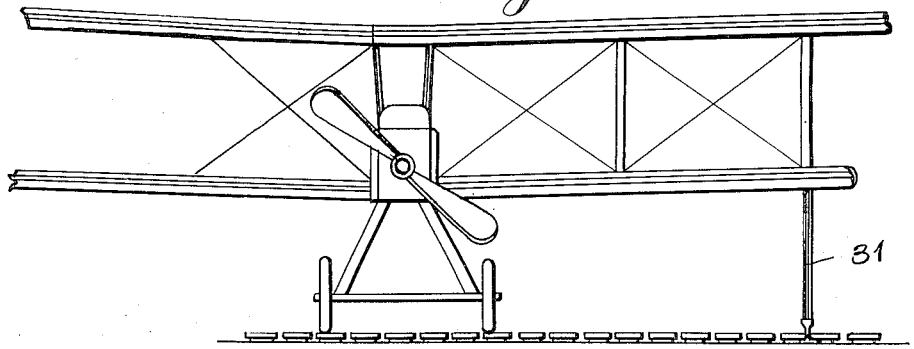
Fig. 9.
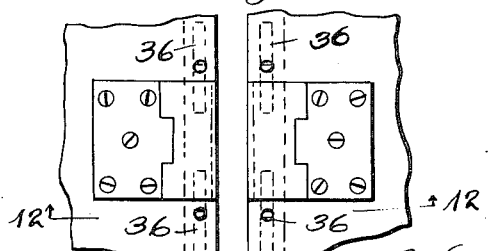
Fig. 10.
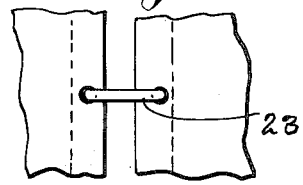
Fig. 11.
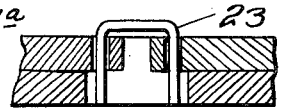
Fig. 11a
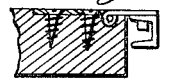
Fig. 12.
Fig. 12a.
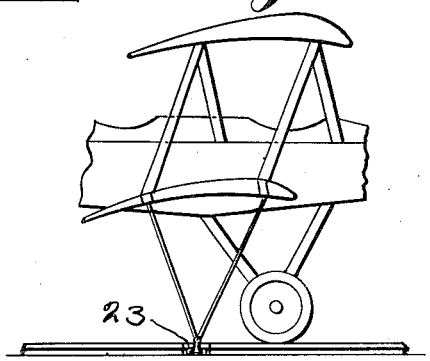
Fig. 13.
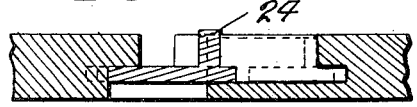
Fig. 14.
Fig. 14a.
Inventor
R. E. Bassler
By
Attorney July 29, 1924.
R. E. BASSLER
AIRCRAFT ARRESTING DEVICE
Filed Jan. 30, 1923   4 Sheets-Sheet 4
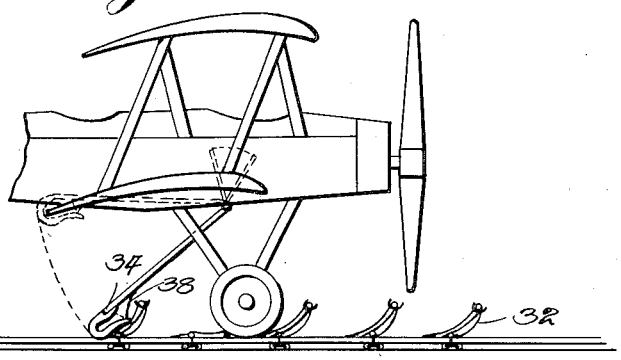
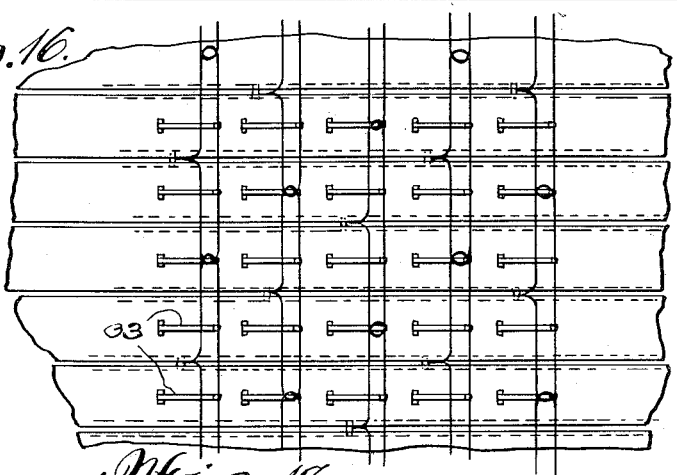
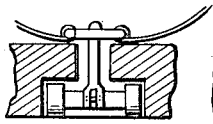
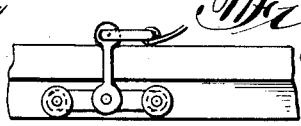
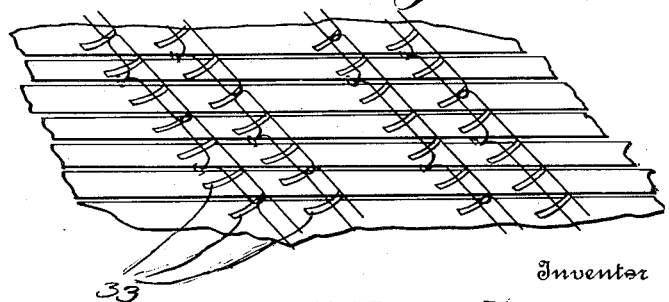
Inventor
R. E. Bassler
By
Attorney Patented July 29, 1924.

1,502,653

UNITED STATES PATENT OFFICE.

ROBERT E. BASSLER, OF BROOKLYN, NEW YORK.

AIRCRAFT-ARRESTING DEVICE.

Application filed January 30, 1923. Serial No. 615,853.

*To all whom it may concern:*

Be it known that I, ROBERT EDWARD BASSLER, a citizen of the United States, residing at Brooklyn, New York, have invented new and useful Improvements in Aircraft-Arresting Devices, of which the following is a specification.

This invention relates to a landing gear for aircraft and more particularly to devices for the arresting of aircraft in general and airplanes in particular and has for its object to enable aircraft to land in a comparatively confined space as, for example, the deck of a ship, or roof of a building in the heart of a city, and be secured to its landing space as described. It applies mainly to land planes and amphibious planes, but with slight modifications can be used with all aircraft.

In order to land a plane on the deck of a ship or the roof of a building, the plane must be accurately and skillfully piloted, and weather conditions reasonably good. Should the pilot fail to engage the arresting gear on any attempt, it is possible for him to regain flying speed and circle around and make another attempt. It is also desirable that aircraft fly into the wind in order that their landing speed relative to the object to be landed upon may be thus reduced by the velocity of the wind. Although this is not entirely necessary, provision is made to effect this condition. Obviously the ship can turn into the wind and if under way, still further reduce the relative speed of the aircraft to the platform or deck of the ship to be landed upon. When the device is to be located on the roof of a building, it can be placed on a revolvable platform or turntable which can be so turned as to enable the aircraft to land into the wind.

By means of the present invention, the aircraft can land on the given area, and be arrested during its entire length of run, and after coming to rest, it may be secured to the deck by the devices hereinafter described. This point is important especially on ships since gusts of wind could readily damage the plane if any slack existed between the plane and the arresting apparatus. As soon as it has come to rest, it can be still further secured by special holding down trolleys or slippers and by means of a deck trolley slot system it may be removed to the hangar in or on the roof of the building or to the elevator and thence below the deck of the ship.

In like manner, when taking off the roof or the deck of the ship, the aircraft is thoroughly secured at all times, thus decreasing the danger to personnel and material. The braking system used in conjunction with this device, will effectively prevent the aircraft from any fore and aft movement after coming to rest while transverse movement is obviously impossible from an examination of the device hereinafter described.

With this understanding in mind it may be stated that one of the objects of the present invention is to provide a simple and practical device or system of the above general character which will permit airplanes or aircraft to land in a relatively small area, which area is substantially smooth and not cluttered up with complicated mechanisms which might interfere with its usefulness as a landing deck.

Another object is to provide an improved method of landing aircraft in a restricted area.

Other objects will be in part obvious and in part hereinafter pointed out in connection with the accompanying sheets of drawings forming part of this disclosure and in the several views of which similar reference characters denote corresponding parts.

In these drawings, Figure 1 is a partial plan view of the deck of a ship with relation to which the present invention will be hereinafter described although it is to be understood that without material modification this same arrangement could be applied to a turn-table located on the top of a building or any other confined place.

Figures 2 and 3 are front and side elevations of an airplane landing and engaging with one form of the arresting means.

Figure 4 is a perspective view of a portion of the top of the system.

Figure 5 is a detail transverse sectional view of one slot showing one style of trolley or slipper in elevation.

Figure 6 is a longitudinal view of the parts shown in Figure 5.

Figure 7 is a detail view of a hook in closed position.

Figure 8 is a cross section of one of the ramps.

Figure 9 is a front elevation showing the anchoring means as applied at the wing tips.

Figure 10 is a detailed view of means for removing trolleys or slippers.

Figures 11 and 11ª are a plan and sectional view of a form of stop.

Figures 12 and 12ª are sections through Figure 10 at right angles to each other.

Figure 13 is a side elevational view showing the manner in which the airplanes are moored or anchored on the deck.

Figures 14 and 14ª are a plan and cross-sectional view of a switch.

Figure 15 is a side elevational view showing modification of the form shown in Figures 2 to 8 inclusive.

Figure 16 is a plan view of the modified system.

Figures 17 and 17ª are longitudinal and transverse sectional views of a portion of the arresting mechanism.

Figure 18 shows a perspective view of Figure 16.

Figure 19 shows a sectional elevation of a slot with the trolley or slipper and the channel beneath same to apply friction.

Figure 20 illustrates one method of applying the frictional resistance to the slipper through the use of cylinders raising the channel.

Figure 21 illustrates another method of applying the frictional resistance to the slipper by means of links raising the channel when same is pulled by a cable.

The installation of a deck trolley or a slipper system on an aircraft carrier or landing stage would necessitate a false deck being built above the deck plating of the carrier, since it would be desirable to place the braking means beneath the upper surface. The usual deck planking, as used on weather decks, might be found suitable. The deck planking would extend the entire length of the ship, and there would be cut into this deck planking a series of inverted T or other suitably shaped slots, as shown in Figure 5. Figure 1 shows a proposed layout of the slot system, using a plurality of slots. Those on the after portion of the ship 49, Figure 1, would be used for landing and arresting devices, and these slots would run parallel to a point just before an elevator 47, Figure 1, is reached. In landing the plane, due to the braking means, it would have come to rest before this elevator is reached, and since all slots converge to a central slot passing through deck planking built over the elevator platform, the airplane could be hauled by hand on to the elevator, where, if it were of small size, it could be lowered immediately beneath the deck. If it were too large for the after elevator 47, Figure 1, it could be hauled up the deck to a forward elevator 48, Figure 1, and taken beneath the deck at that point. After passing the after elevator, the trolley slot system again expands, as shown in Figure 1, and this portion 50, Figure 1, may be used for holding planes to the deck and preparing them for taking off. Portion 50, again contracts before the forward elevator 48, Figure 1, which has slots cut through it in a similar manner to the after elevator. Portion 22, of the slot system is to be used for holding planes to the deck, and also for flying off. It is obvious that the slots do not interfere with the value of the deck as a flying off or landing deck, since they are comparatively narrow.

It may also be discerned that at no time is it possible for an airplane to lash around on the deck because it is thoroughly secured at two or more points; for instance, the wing tips or any point along the wings or the landing gear or tail skid. Transverse motion being prevented by the longitudinal slot system, longitudinal motion is taken care of by U pins 23, Figure 11, which are inserted before and after each holding down trolley or slipper. Figure 9 shows a plane with the holding down device attached to the lower outboard wing tip, and Figure 13 shows the side elevation of the same device. An aviator could, therefore, climb into his plane, tune up his motor until ready to take off, and all tractive effort on the part of the propeller would be overcome through the holding down trolleys and U pins inserted before and after each trolley. After making everything in readiness to take off, quick releasing devices at the upper end of the holding down straps would permit him to fly off. The straps, falling to the deck, would offer no interference to the aviator in the plane next behind the one just taking off, and it would be possible to send planes from the deck of the carrier as fast as they could take off, and the number of planes taking off would only be limited by the deck area available to hold them down. Very few attendants would be required and this is desirable from the standpoint of having the deck space free and clear at all times. Figures 10 and 12 show a suggested form of slot hand hole. The purpose of these hand holes, which would be located along the slots at necessary intervals, is to remove arresting trolleys or slippers and holding down trolleys or slippers when they have served their purpose, or to insert them in the proper slots where required. Any obstruction which might tend to foul the slot could be brought to a hand hole point and removed through it. Bolts 36, Figure 10, lock this hand hole plate shut.

Switching is accomplished by means of a similar bolt, 24, Figures 14 and 14ᴬ, and these are also located where required. Any other well-known or desired form of switch may, however, be used. Since the bolt, 24, in its extended position obstructs the straight line, the trolley is deflected into the cross-over slot. Obviously, if it is more desirable to modify the shape and form of the slots and trolleys or slippers for any purpose, the form of switch will be varied to accommodate the variations made in the shape and form of the slots and trolleys.

In the arresting device shown in Figures 2 to 8, inclusive, it is proposed to have a series of trolleys or slippers, 25, Figure 5, each of which carries a hooking device, which extends above the deck in the manner shown in perspective, Figure 4. These trolleys or slippers weigh as little as is consistent with the strength required, so that their inertia will be a minimum, and no appreciable jar will be felt as the plane picks them up. To engage this hook, a cable loop or drag 30, Figure 3, is housed in or immediately beneath the fuselage of the plane. It consists of a crossed loop or cable with the upper portions inserted and fastened into a steel tube in order to make it more rigid. It may be fastened up by means of a lever 26, Figure 3, in one of the pilot's cock pits. When released it is held in a downward position so that it may touch the deck as the plane rolls along the deck, and not bound into the air and possibly fail to engage the hook. Situated immediately before the hook in each slot is a ramp 28, Figures 3, 4, and 6, of tapering triangular section. The large end of each ramp is nearest the hook, and the small end pointed away from the hook. The purpose of each ramp is to prevent the wheels of the landing gear from fouling a hook and they are of the proper size to keep the wheels of the plane between the hooks as shown in Figure 2. In the event that the wheels are not deflected, a ball and socket joint 35, Figure 7, will permit the hook to turn down and give before the landing gear. The loop, being located beneath the center of the fuselage is, of course, of sufficient size to barely overlap two hooks in order that at least one will be engaged. Figure 3 shows the loop engaging the hook and closing it as shown in Figure 7. A small latch 37 prevents the hook from reopening until released by hand. Obviously the center to center distance of the landing gear wheels should be a multiple of the deck trolley spacing, as shown in Figure 2. It should be further noted that the engaging means on the plane do not necessarily have to be located where shown, but may be applied to portions of the landing gear, such as the tail skid or axle or to a hydrovane if the plane has one.

Figures 15 to 18 inclusive show a modified form of arresting device. Modifications are as follows. Instead of the loop 32, Fig. 15, being attached to the aircraft, it is attached to the trolley or slipper and the hook 34, Fig. 15, which in the other form was on the trolley or slipper has been transferred to the aircraft. The mode of operation is similar to the previous case, the aviator releasing his hook, which is held down against the deck in order that it may engage the loops which are held in an open position by means of spring clips 33, Figs. 16 and 18, or some other device. Each loop is so held as to overlap at least one adjacent slot. Figure 16 shows five such rows of loops. Figure 18 shows a perspective view of the deck with two groups of two rows of loops. One or more rows of loops may be used and the apparatus will be successful as the entire width of landing deck has at least one loop for the hook to function with. The spring clips holding the loops up have just sufficient spring to them to barely hold the loop in an open position. It is, therefore, possible for the aircraft landing gear to ride over the loops and press them to the deck without any serious detriment to the plane as shown in Figure 15. Obviously the loop which will probably be engaged by the hook will remain in its upright position since the wheels will pass over only those in their direct path, and not those in the path of the hook. After the hook has picked up any cable loop, the trolley or slipper is dragged along as in the previous case with any desired braking action. The hook has a locking device 38 to prevent the loop from becoming disengaged.

Two forms of braking are suggested. In each case the frictional resistance is obtained through the medium of a surface being pressed against the slipper or trolley, and binding same in the slot. In the one form of braking, the binding surface is composed of a channel 39, Figure 20, which is supported at intervals by struts 45, Figure 20, directly connected to pistons 42 in cylinders 40. Hydrostatic or air pressure applied to all cylinders by a pipe 45' would supply the necessary pressure to squeeze the trolley or slipper between the binding surface 39, Figures 19 and 20, and the other part of the slot. In this case it is obvious that the frictional resistance could be varied by varying the area of the cylinders 40 and pistons 42 along the run of the trolley or slipper. This variation could be so arranged as to increase the frictional resistance as the plane decreased in speed.

The other form of braking suggested is to use a channel or other suitable means in each slot. The web of the channel 39, Figures 19 and 21, would be as wide as the trolley or slipper, and would bear directly against the trolley or slipper. Each channel would be supported along each flange by small links 43, Figure 21, which would permit it to fold against the structure to which the links are fastened. It is, therefore, obvious that by means of a cable 44, Figure 21, pulling on each channel, the tendency would be for the channel to move away from the structure to which it is attached by the links and, therefore, move toward the trolley or slipper against which it is to press.

In like manner the frictional resistance could be varied by varying the pull in the cables which raise the channels over the structure that they fold against. The web of each channel should be rolled down as at 46, Figures 20 and 21, in order to afford easy entrance to the trolley or slipper as it leaves each channel section and enters the next section. Of course, it is obvious that friction may be applied in any manner to any part or surface of the trolley or slipper.

From the above it will be seen that the present invention comprehends a movable platform with certain instruments associated therewith whereby an airplane may be landed safely in a relatively restricted area and speedily brought to rest and subsequently moved to any desired point of storage.

While I have described what I consider the preferred forms of my invention, I do not limit myself to the form shown but claim as my invention any device coming within the scope of the appended claims.

What I claim is:—

1. In an apparatus of the character described, in combination, a movable platform having a longitudinally disposed slot therein, movable means carried by said slot and projecting above the platform, said movable means adapted to be engaged by a drag on the aircraft and normally freely sliding in said slot, and braking means cooperating with the afore-mentioned means to bring the aircraft to rest.

2. In an apparatus of the character described, in combination, a movable platform having a plurality of slots therein, movable means carried by said slots and projecting above the platform, said movable means adapted to be engaged by a drag on the aircraft and normally freely sliding in said slot, and braking means cooperating with the afore-mentioned means to bring the aircraft to rest.

3. In an apparatus of the character described, in combination, a movable platform having a longitudinally disposed slot therein, movable means carried by said slot and projecting above the platform, said movable means normally freely sliding in the slot and adapted to be engaged by an aircraft and braking means cooperating with the first mentioned means to bring the aircraft to rest, one of said engaging means comprising a loop to engage the hook.

4. In an apparatus of the character described, in combination, a movable platform having a plurality of slots therein, movable means carried by said slots, and projecting above the platform, said movable means normally freely sliding in said slots and adapted to be engaged by a means on the aircraft, and braking means cooperating with the first mentioned means to bring the aircraft to rest, one of said engaging means comprising a hook and the other said means comprising a loop to engage with the hook.

5. In an apparatus of the character described, in combination, a platform provided with longitudinally disposed slots, movable members in said slots to engage an airplane on landing and be moved along said slots as the movement of the airplane is arrested, said slots being provided with switches whereby after the airplane is arrested it may be moved to other slots as desired.

6. In an apparatus of the character described, in combination, a platform provided with longitudinally disposed slots, movable members in said slots adapted to engage an airplane on landing and be moved along said slots as the movement of the airplane is arrested, said slots being provided with switches whereby after the airplane is arrested it may be moved to other slots as desired, each of said arresting means comprising a device anchored in the slot and provided with a means to engage the airplane.

7. In an apparatus of the character described, in combination, a platform provided with longitudinally disposed slots, movable members in said slots adapted to engage an airplane on landing and be moved along said slots as the movement of the airplane is arrested and a locking device to prevent disengagement with the airplane until desired.

8. In an apparatus of the character described, in combination, a platform provided with longitudinal slots, devices anchored in said slots, means provided to keep said devices in a position to engage an airplane on landing said device being free to travel with the aircraft engaging the same.

9. The method of landing an aircraft in a restricted space consisting of alighting on a substantially smooth platform, automatically engaging a means of negligible inertia carried by the platform with a part of the aircraft, applying frictional force to the means carried by the platform resisting the forward motion of the aforementioned means and aircraft and thus bringing the aircraft to rest.

10. The method of landing an aircraft in restricted space consisting of alighting on a substantially smooth platform, automatically engaging a means of negligible inertia carried by the platform with a part of the aircraft, applying frictional force to the means carried by the platform resisting the forward motion of the aforementioned means and aircraft, increasing the frictional force as the speed of the aircraft decreases and thus bringing the aircraft to rest.

11. The method of landing an aircraft in a restricted space consisting of alighting on a substantially smooth platform, releasing a dragging member which automatically engages a means of negligible inertia carried by the platform, applying frictional force to the means carried by the platform resisting the forward motion of the aforementioned means and aircraft, said force being applied below the upper surface of the platform and thus bringing the aircraft to rest.

12. The method of landing an aircraft in a restricted space consisting of alighting on a substantially smooth platform, releasing a dragging member which automatically engages a means of negligible inertia carried by the platform, applying frictional force to the means carried by the platform resisting the forward motion of the aforementioned means and aircraft, said force being applied below the upper surface of the platform, increasing the frictional force as the speed of the aircraft decreases, and thus bringing the aircraft to rest.

13. The method of landing an aircraft in a restricted space consisting of alighting on a substantially smooth platform, releasing a dragging member which automatically engages a means of negligible inertia carried by the platform, applying frictional force to the means carried by the platform resisting the forward motion of the aforementioned means and aircraft, said force being applied below the upper surface of the platform, applying a varying frictional force as the speed of the aircraft decreases, and thus bringing the aircraft to rest.

14. An aircraft landing device, consisting of a platform, longitudinal slots in the platform, movable means within and projecting above said slots to engage the aircraft, deflecting means situated in and extending above the slots and in front of the engaging means.

15. An aircraft landing device, consisting of a platform, longitudinal slots in the platform, movable means within and projecting above said slots to engage the aircraft, deflecting means situated in and extending above the slots and in front of the engaging means, said deflecting means consisting of tapering shaped pieces to guide the wheels of the aircraft and prevent the same from fouling the aforementioned engaging means.

16. The method of landing an aircraft in a restricted space consisting of alighting on a substantially smooth platform, engaging a means carried by the platform with a part of the aircraft, said means being free to travel in the general direction in which the aircraft is moving, and then applying force to the afore-mentioned means resisting the motion of the means and the aircraft to bring the aircraft to rest.

17. The method of landing an aircraft in a restricted space consisting of alighting on a substantially smooth platform, engaging a means carried by the platform with a part of the aircraft, said means being free to travel in the general direction in which the aircraft is moving, applying frictional force to the means carried by the platform resisting the forward motion of the afore-mentioned means and aircraft, and thus bringing the aircraft to rest.

18. The method of landing an aircraft in a restricted space consisting of alighting on a substantially smooth platform, releasing a dragging member which engages a means free to travel in the general direction in which the aircraft is moving and carried by the platform with a part of the aircraft applying frictional force to the means carried by the platform, resisting the forward motion of the afore-mentioned means and aircraft, said force being applied below the upper surface of the platform, applying a varying frictional force as the speed of the aircraft decreases and thus bringing the aircraft to rest.

19. The method of landing an aircraft in restricted space consisting of alighting on a substantially smooth platform, engaging a means free to travel in the general direction in which the aircraft is moving and carried by the platform with a part of the aircraft, applying frictional force to the means carried by the platform resisting the forward motion of the afore-mentioned means and aircraft, increasing the frictional force as the speed of the aircraft decreases and thus bringing the aircraft to rest.

20. The method of landing an aircraft in a restricted space consisting of alighting on a substantially smooth platform, releasing a dragging member which engages a means free to travel in the general direction in which the aircraft is moving and carried by the platform with a part of the aircraft applying frictional force to the means carried by the platform, resisting the forward motion of the afore-mentioned means and aircraft, said force being applied below the upper surface of the platform and thus bringing the aircraft to rest.

21. The method of landing an aircraft in a restricted space consisting of alighting on a substantially smooth platform, releasing a dragging member which engages a means free to travel in the general direction in which the aircraft is moving and carried by the platform with a part of the aircraft applying frictional force to the means carried by the platform, resisting the forward motion of the afore-mentioned means and aircraft, said force being applied below the upper surface of the platform, increasing the frictional force as the speed of the aircraft decreases, and thus bringing the aircraft to rest.

22. In an apparatus of the character described, in combination, a platform provided with longitudinal slots, devices mounted in said slots, a portion of each device projecting from the slots to engage an aircraft on landing, said devices being normally free to move along said slot with the aircraft, and means for applying a friction force opposing the movement of said devices.

Signed at Washington, District of Columbia, this 17th day of November, 1922.

ROBERT E. BASSLER.